(12) United States Patent
Amos et al.

(10) Patent No.: US 11,143,350 B2
(45) Date of Patent: Oct. 12, 2021

(54) WRAPPED HOSE HEATER ASSEMBLY WITH HOT POCKET CONFIGURATION

(71) Applicant: Parker-Hannifin Corporation, Cleveland, OH (US)

(72) Inventors: David Amos, South Euclid, OH (US); Ty Henry, Atwater, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 439 days.

(21) Appl. No.: 16/321,269

(22) PCT Filed: Aug. 3, 2017

(86) PCT No.: PCT/US2017/045282
§ 371 (c)(1),
(2) Date: Jan. 28, 2019

(87) PCT Pub. No.: WO2018/034853
PCT Pub. Date: Feb. 22, 2018

(65) Prior Publication Data
US 2019/0170283 A1 Jun. 6, 2019

Related U.S. Application Data

(60) Provisional application No. 62/375,081, filed on Aug. 15, 2016.

(51) Int. Cl.
*F16L 53/38* (2018.01)
*H05B 3/34* (2006.01)
*H05B 3/58* (2006.01)

(52) U.S. Cl.
CPC ............... *F16L 53/38* (2018.01); *H05B 3/34* (2013.01); *H05B 3/58* (2013.01)

(58) Field of Classification Search
CPC .. F16L 53/38; H05B 3/34; H05B 3/58; H05B 3/342; H05B 3/347; H05B 3/26;
(Continued)

(56) References Cited

U.S. PATENT DOCUMENTS

| 4,214,147 A | 7/1980 | Kraver |
| 4,314,144 A | 2/1982 | Wojtecki et al. |

(Continued)

FOREIGN PATENT DOCUMENTS

| WO | WO 2014042613 | 3/2014 |
| WO | WO 2015086963 | 6/2015 |

OTHER PUBLICATIONS

International Search Report and Written Opinion of PCT/US2017/045282 dated Nov. 15, 2017.

*Primary Examiner* — Shawntina T Fuqua
(74) *Attorney, Agent, or Firm* — Renner, Otto, Boisselle & Sklar, LLP

(57) ABSTRACT

A wrapped heating assembly may be wrapped around a tubular member for heating the tubular member. The wrapped heating assembly includes an outer insulation sleeve and a pocketed heating system that is fixed to an inner surface of the outer insulation sleeve in a manner that forms longitudinal pockets that extend between a first end of the outer insulation sleeve and a second end of the outer insulation sleeve. One or more heater strips are each respectively inserted longitudinally into a corresponding one of the pockets, wherein heat is generated by the heater strips when electrical current flows through the heater strips for heating the tubular member in a wrapped position. Multiple wrapped heating assemblies may be daisy chained together by electrical connectors into a heating system with a single thermostat and linked to a single power source to accommodate a wide range of configurations of tubular member systems.

18 Claims, 6 Drawing Sheets

(58) Field of Classification Search
CPC .......... H05B 3/0038; H05B 3/36; H05B 3/40; H05B 3/50; H05B 3/0053; H05B 2203/016; H05B 2203/017; H05B 2203/022; H05B 2203/036
See application file for complete search history.

(56) References Cited

U.S. PATENT DOCUMENTS

| | | |
|---|---|---|
| 4,534,065 A * | 8/1985 | Comfort ................ A47G 9/066 2/69.5 |
| 6,996,337 B2 | 2/2006 | Auber |
| 8,633,425 B2 | 1/2014 | Naylor et al. |
| 2014/0069540 A1 | 3/2014 | Chesnais et al. |
| 2016/0223116 A1 | 8/2016 | Borgmeier et al. |

* cited by examiner

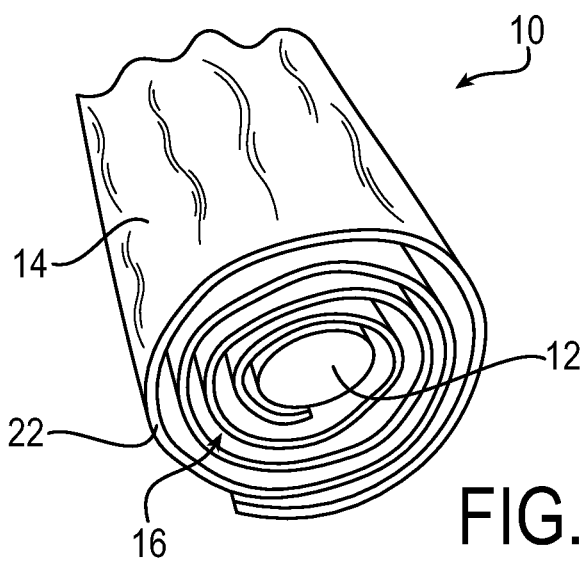
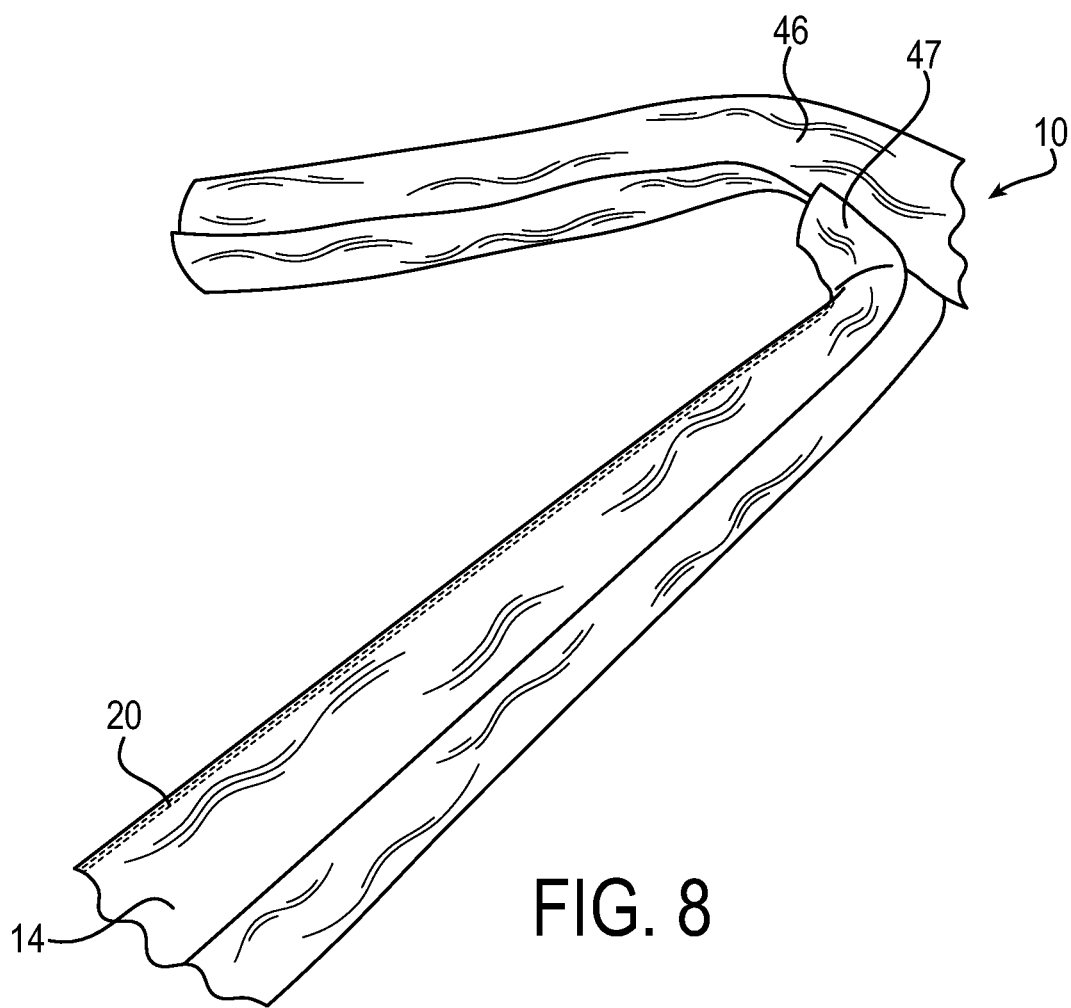

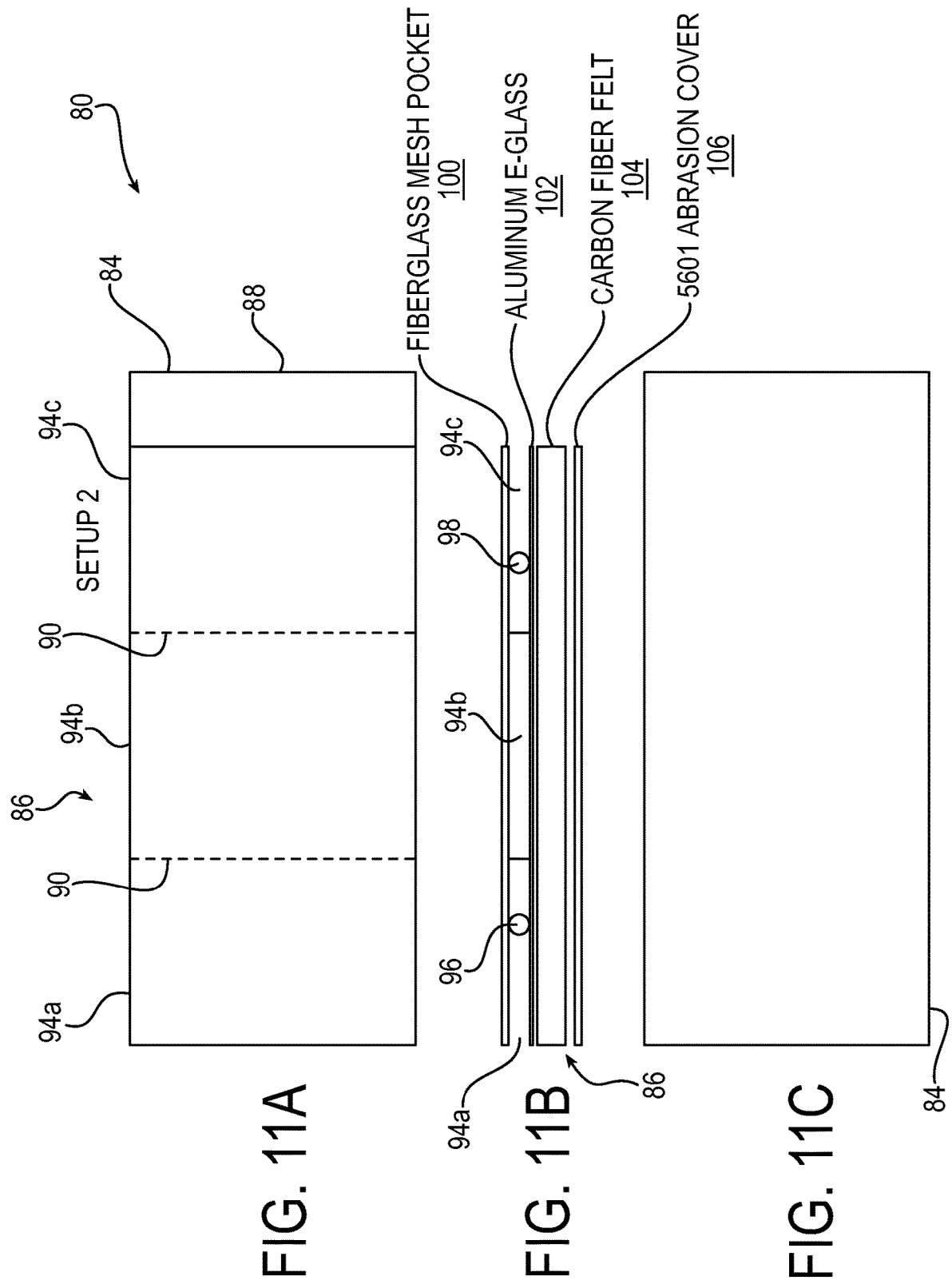

WRAPPED HOSE HEATER ASSEMBLY WITH HOT POCKET CONFIGURATION

RELATED APPLICATIONS

This application is a national stage application pursuant to 35 U.S.C. § 371 of PCT/US2017/045282 filed on Aug. 3, 2017, which claims the benefit of U.S. Provisional Application No. 62/375,081 filed Aug. 15, 2016, which are incorporated herein by reference.

FIELD OF INVENTION

This invention relates generally to heated hose assemblies, and more specifically relates to electrically heated hose configurations that prevent or minimize condensation of gases or coagulation or freezing of liquids within the hose assembly at relatively low ambient temperatures.

BACKGROUND OF THE INVENTION

Hoses convey liquids and gases between spaced locations. The term "hose" refers to any generally tubular, elongated member or device and includes flexible, semi-flexible and rigid devices commonly referred to as "hoses," "tubes," "pipes" and the like. Hoses may have different cross-sections, and may have for example, round, oval, polygonal or other cross sectional shapes. Hoses may be of any material, including, for example, thermosetting, thermoplastic, metallic and non-metallic materials. Hoses may be single wall, multiple wall, reinforced or non-reinforced, and may include end fittings or no end fittings.

When hoses are used to convey liquids and gases in environments with ambient temperatures that change over time, it may be desirable to prevent or minimize condensation of gases, or coagulation or freezing of liquids, within the hose at relatively low ambient temperatures. Such applications include prime mover engine applications, such as, for example, transportation vehicles (including, automobiles, trucks, buses, trains, aircraft, refrigeration trailers and the like), construction vehicles, farm equipment, mining equipment, and stationary equipment such as diesel engine driven electric generators. In these and similar applications, hoses are exposed to ambient temperatures that change over a wide range. Hoses in such applications may be used for a wide variety of purposes, including for example, conveying gases or liquids in engine crankcase ventilation systems, fuel systems, hydraulic systems, pneumatic systems, coolant systems, refrigerants, emulsions, slurries, selective catalytic reduction systems, and others.

Various systems have been developed to provide for heated hoses to prevent or minimize condensation of gases, or coagulation or freezing of liquids at relatively low ambient temperatures. An example of an enhanced heated hose assembly is disclosed in Applicant's International Patent Application No. PCT/US2015/15542 filed on Feb. 12, 2015, which is incorporated here by reference. The heated hose configuration described therein provides for effective heating in a variety of applications.

One drawback of conventional heated hose assemblies, including Applicant's enhanced configuration, is that the heated hose assemblies typically have been manufactured as suited for a particular application. A hose heating system therefore tends to be manufactured for, and attached to or incorporated as part of, a particular hose configuration. A universal heated hose assembly suitable for most any application generally has not been available. This lack of universality renders manufacturing more costly and complex, as different hose configurations with respective customized heating systems must be separately supplied for different categories of applications.

Another option has been to attempt to apply or retrofit a heating structure to a conventional non-heated hose configuration. Existing after-applied or retrofitted hose heating structures, however, have been relatively complex so as to require installation to the hoses by specially trained personnel in a non-field setting. The result is that hoses often need to be procured from or provided by the end user, after which the trained personnel can apply the heating structure solution in the non-field setting. This results in downtime as the heating structures are installed to the hoses, and then returned to the end user for re-installation.

In addition, hose technologies and heating technologies typically are not developed in a paired manner or in combination. This means that an insulating sleeve, heating element, and thermostat, for example, often have to be bought and designed separately from each other and from the hose structure. Separate design procedures can result in incompatibility issues, for example when the heating assembly structure and the hose structure are from different manufacturers, or the hose is configured for a particular application that is not compatible with "off-the-shelf" heating system elements. In such cases, an after-applied or retrofitted heating system may need to be individually customized, which also can add to complexity and cost. Relatedly, many off-the-shelf heating system components may have limited use to only a particular electrical rating, typically 120/240 VAC voltage in most applications. Another potential electrical rating for certain applications is operation using 12/24 VDC voltage, for which adequate hose heating systems are not readily available.

SUMMARY OF THE INVENTION

The present invention pertains to an enhanced wrapped heating assembly that that may be used essentially universally, with a variety of hose configurations, applications, and power and electrical ratings, and which also can be installed by field service personnel in the field without having to procure the hose structures for a non-field installation. In exemplary embodiments, a wrapped heating assembly may include a heater strip in combination with an insulated sleeve. The insulated sleeve may include one or more stitched pockets, and preferably a plurality of stitched pockets, into which the heater strips may be inserted longitudinally along the sleeve. The sleeve may include a reflective inner layer to enhance heating efficiency. The sleeve also may have one or more strip fasteners, such as for example double mechanical fastener strips (e.g., VELCRO® in one potential embodiment) to allow for better installation on a wide range of hose sizes and shapes.

By utilizing one or more heater strips inserted into a pocketed sleeve, the wrapped heating assembly may be readily customized to any suitable hose configuration, power density, and electrical rating, and can be removed and replaced thereby permitting a customer to fine tune power and heating needs for any particular application. Removal and replacement may be performed by field service personnel in the field with only minimal training. As part of the customization, end connector elements that extend from the pocketed sleeve may be employed to daisy chain multiple wrapped heating assemblies together. In this manner, long lengths of hose or tubing may be accommodated, and the daisy chained assemblies may be used to heat multiple sections or separate hoses within an overall hose system, with using only a single power source for heating the multiple assemblies.

The wrapped heating assembly further may include a thermostat to make the heating assembly self-regulating. With a daisy chained configuration, the thermostat may be located at the most critical location (typically the coldest location) in the system and may control the on/off function of the circuit for the entire daisy chained expanse of the multiple wrapped heating assemblies. The thermostat may also assist to control power consumption, and limit power consumption to specific conditions, such as for example potential freeze conditions and protecting the heating elements from overheating. Additionally, the wrapped heating assemblies may be configured to be suitable for applications operating at 12/24 VDC voltage, which are underserved by existing hose heating systems.

An aspect of the invention, therefore, is a wrapped heating assembly that may be wrapped around a tubular member for heating the tubular member. In exemplary embodiments, the wrapped heating assembly may include an outer insulation sleeve and a pocketed heating system that is fixed to an inner surface of the outer insulation sleeve in a manner that forms one or more longitudinal pockets that extend between a first end of the outer insulation sleeve and a second end of the outer insulation sleeve opposite from the first end. The wrapped heating assembly further may include one or more heater strips, with each one of the heater strips being respectively inserted longitudinally into a corresponding one of the pockets, wherein heat is generated by the heater strips when electrical current flows through the heater strips to heat the tubular member.

Multiple wrapped heating assemblies may be daisy chained together by electrical connectors into a heating system having a wide range of configurations to accommodate various configurations of hose systems and other tubular member systems and combinations. With the daisy chaining, the heating system may be controlled with a single thermostat and linked to a single power source.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 7 is a drawing depicting an end view of the wrapped heating assembly of FIG. 6 in a wrapped position in accordance with embodiments of the present invention.

FIG. 8 is a drawing depicting another exemplary wrapped heating assembly in a wrapped position for a non-straight hose configuration in accordance with embodiments of the present invention.

FIGS. 11A, 11B, and 11C are related drawings depicting respectively inner, side cross-sectional, and outer views of an exemplary wrapped heating assembly in accordance with embodiments of the present invention.

DETAILED DESCRIPTION

Figure 1:
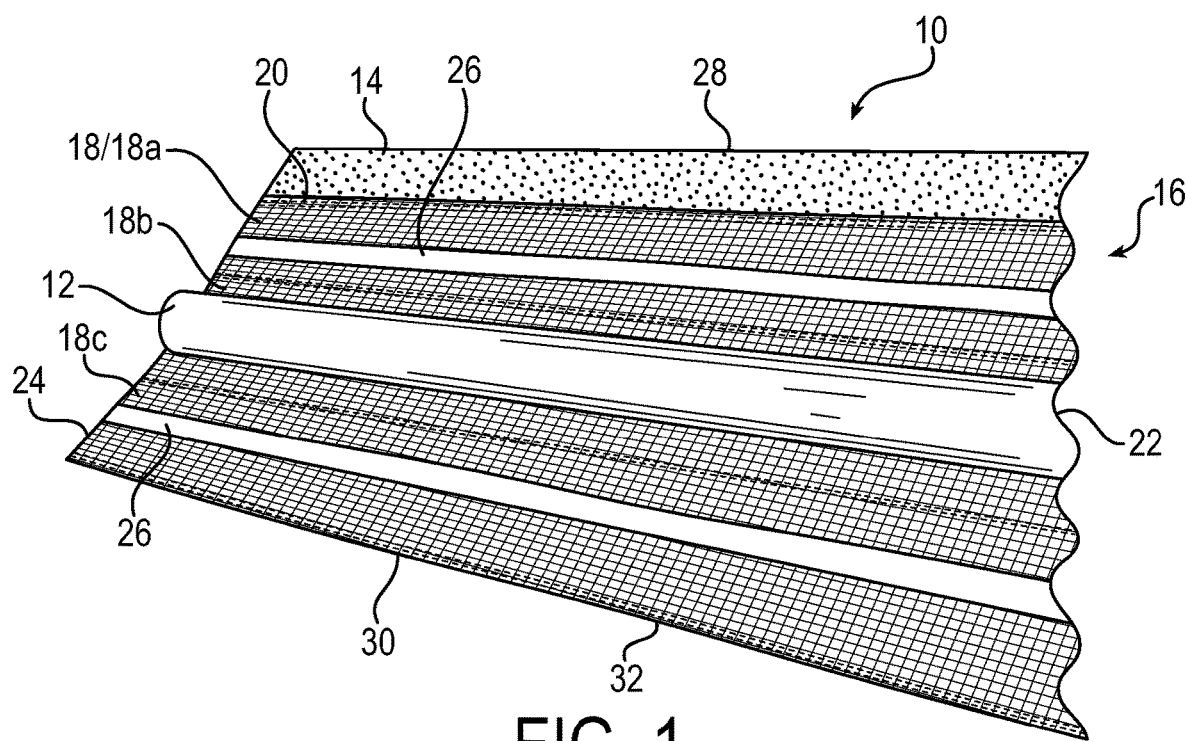
FIG. 1 is a drawing depicting an exemplary wrapped heating assembly in an unwrapped position relative to a hose, in accordance with embodiments of the present invention.

Embodiments of the present invention will now be described with reference to the drawings, wherein like reference numerals are used to refer to like elements throughout. It will be understood that the figures are not necessarily to scale.

FIG. 1 is a drawing depicting an exemplary wrapped heating assembly 10 in an unwrapped position relative to a hose 12, in accordance with embodiments of the present invention. The hose 12 shown is an example, but may more generally be referred to as a tubular member 12 having any suitable configuration. For example, the tubular member 12 may have a cross-section of any suitable shape, such as for example, round, oval, polygonal or other cross sectional shape. The tubular member 12 may be made of any suitable material as are known in the art, including for example, thermosetting, thermoplastic, metallic and non-metallic materials. The tubular member may be single wall, multiple wall, reinforced or non-reinforced, and may include end fittings or no end fittings. The tubular member further may be straight or configured into any suitable shape with bends or turns. The hoses, pipes, and other tubular members that require heating may be constructed of any material capable of withstanding cold temperatures seen in cold environments (for example, down to −40° C.), and also are capable of withstanding the higher temperatures given off by the heating elements of the wrapped heating assembly. Suitable materials of the tubular member may include, but are not limited to, polyamide plastic, EPDM rubber, fluoropolymers, or braided/solid steel, any of which may or may not be reinforced. The wrapped heating assembly 10 may be wrapped around the hose 12 to heat the hose 12 when electrical current flows through heater strip components of the wrapped heating assembly.

Generally, in exemplary embodiments the wrapped heating assembly may include an outer insulation sleeve, and a pocketed heating system that is fixed to an inner surface of the outer insulation sleeve in a manner that forms one or more longitudinal pockets that extend between a first end of the outer insulation sleeve and a second end of the outer insulation sleeve opposite from the first end. The wrapped heating assembly further may include one or more heater strips, with each one of the heater strips being respectively inserted longitudinally into a corresponding one of the pockets, wherein heat is generated by the heater strips when electrical current flows through the heater strips. The pocketed heating system may be fixed to an inner surface of the outer insulation sleeve in a manner that forms a plurality of pockets with one or more pockets respectively containing a heater strip (also referred to as "hot pockets"), with the other pockets being empty or not containing a heater strip.

Referring to the exemplary embodiment depicted in FIG. 1, the wrapped heating assembly 10 may include an outer insulation sleeve 14 that has an inner surface onto which is fixed an inner pocketed heating system 16. The insulation sleeve may be made of any suitable insulating material that typically may be used for hose heating applications. Common suitable materials include various carbon fiber materials, such as for example woven nylon or polyester. The hose 12 that is depicted in FIG. 1 is an example, but any elongated tubular member, such as other hoses, tubes, pipes, or the like may be substituted for the hose 12 depicted in FIG. 1.

The pocketed heating system 16 may include a multi-layered material that is fixed to an inner surface of the insulation sleeve 14 in a manner that forms one or more longitudinal pockets 18, and preferably a plurality of pockets 18. The pocketed heating system may be stitched to the inner surface of the outer insulation sleeve with a thread material. For example, the pockets may be formed by longitudinal stitching 20 that runs along a longitudinal axis of the wrapped heating assembly 10 to form longitudinal pockets that extend between a first end 22 and a second end 24 of the insulation sleeve. In this manner, a pocket space is formed between an inner surface of the insulation sleeve 14 and an outer surface of the multi-layered material of the pocketed heating system. "Inner" versus "outer" in this context refers to the positioning of pertinent components relative to the hose in a wrapped position when the wrapped heating assembly 10 is wrapped around a hose, with the hose being the innermost component. In addition, the longitudinal or axial direction is the direction extending between the first and second ends 22, 24 of the wrapped heating assembly 10. In the specific example of FIG. 1, three pockets 18a, 18b, and 18c are formed, although it will be appreciated that any suitable number of pockets may be formed as warranted for the heating needs of any particular application and/or size and dimensional configuration of tubular members.

In FIG. 1, two of the pockets, specifically pockets 18a and 18c, are sliced open so as to expose heater strips 26 that are located within such respective pockets. Because the heater strips are located in one or more of the pockets, such pockets that have a heater strip within may be referred to herein as "hot pockets", and the wrapped heater assembly 10 generally may be referred to as having a hot pocket configuration. The third and central pocket 18b does not include a heater strip in this example, although a heater strip further may be provided in such pocket. Accordingly, a number of heater strips may be either the same or different from a number of pockets in the wrapped heating assembly.

Each heater strip 26 may include internal heater wires or other suitable resistance heating element, wrapped in an outer protective covering, typically a woven fiber cover. To generate heat, electrical current is conducted through the heater wires or other resistance heating element to generate heat as is conventional for hose heating systems.

The heater strips 26 may be inserted in essentially a sliding fashion axially into respective pockets 18 so as to extend along a substantial portion of, up to essentially the entirety of, the wrapped heating assembly 10 in the longitudinal direction. It will be appreciated that the view with pockets sliced open is provided for illustration of the placement of the heater strips. In actual use, of course, the pockets are largely closed structures and any of the heater strips are enclosed within a respective pocket, except that at least one end of the pockets may have an opening of sufficient size that the heater strips may be slid into the respective pockets. The openings of the pockets also may permit lead wiring to extend from the heater strips externally from the wrapped heating assembly for connection to a power source or another adjacent wrapped heating assembly as described further below.

The use of heater strips axially inserted or slid into hot pockets permits a degree of versatility and customization relative to heat output. For example, for relatively large heating needs, all pockets may receive heater strips to be used as hot pockets. For lesser heating needs, one or more of the pockets may be left empty without a heater strip, which results in an overall lower heat output with the resultant heat output being based on the number of hot pockets versus the number of empty pockets. Relatedly, multiple heater strips of different heat output capacities (e.g., at least two heater strips of different heat output capacities) may be provided in different pockets to provide more various intermediate overall heat output capacities through mixing and matching heater strips of various heat output capacities. The wrapped heating assembly 10 of the present invention further may be customized using heater strips of any desired electrical rating. For example, based on a commensurate selection of heater strips, the wrapped heating assembly 10 may be configured for an electrical system operating at 120/240 VAC as is typical for conventional systems. Alternatively, through the use of commensurate heater strips, the wrapped heating assembly may be configured for an electrical system operating at 12/24 VDC voltage, which as referenced above is underserved by existing hose heating systems. The configuration of the wrapped heating assembly also may be altered as between different heat capacities and/or electrical rating by swapping the heater strips in a given pocketed heating system, which can be done easily in the field.

The insulation sleeve may have an edge portion including a fastener element, wherein the fastener element joins opposing edge portions of the insulation sleeve together to secure the wrapped heating assembly in a wrapped position. Referring to the depiction of FIG. 1, for example, one or both of longitudinal opposing edge portions 28 and 30 of the insulation sleeve 14 may be provided with one or more fasteners 32, which may be configured as strip fasteners, such as for example a double mechanical strip fastener that extends longitudinally along at least one of the opposing edge portions of the insulation sleeve. A suitable double mechanical strip fastener is a VELCRO® fastener strip. The fastener or fasteners 32 permit the opposing longitudinal edges to be joined together in a secured fashion when the wrapped heating assembly 10 is wrapped around the hose 12. The fastener configuration permits easy installation of the wrapped heating assembly 10 around the hose 12 in the field, and further provides a degree of adjustability to allow installation over a wide range of hose sizes, shapes, and cross-sections.

Figure 2:
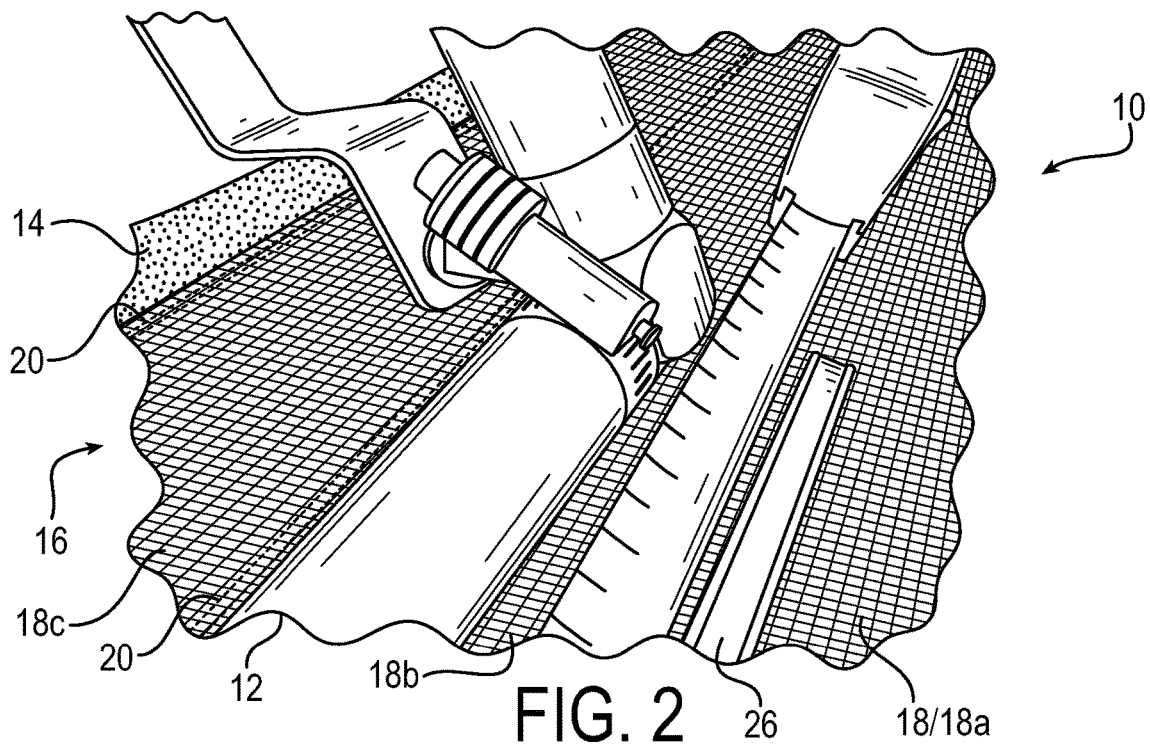
FIG. 2 is a drawing depicting a close-up view of a portion of the wrapped heating assembly of FIG. 1.
Figure 3:
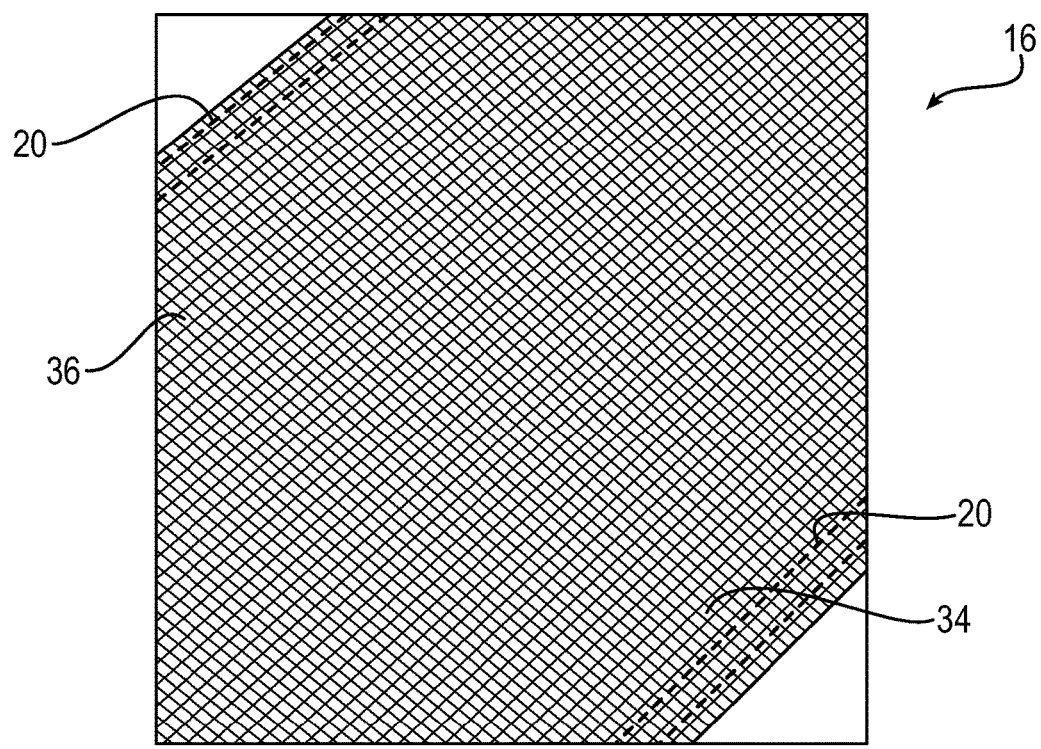
FIG. 3 is a drawing depicting a more limited close-up view of a portion of the wrapped heating assembly extracted from FIG. 2.

FIG. 2 is a drawing depicting a close-up view of a portion of the wrapped heating assembly 10 of FIG. 1. FIG. 3 is a drawing depicting a more limited close-up view of a portion of the wrapped heating assembly extracted from FIG. 2. FIG. 2 provides an enhanced view of the details of the pocketed heating system 16 as positioned relative to the hose 12. Accordingly, like reference numerals are used in FIG. 2 as in FIG. 1. In the depiction of FIG. 2, only one of the pockets (18a) is sliced to expose a heater strip 26. Pockets 18b and 18c are not depicted as sliced open and thus are depicted as the pockets would appear in use, with any of the heater strips being enclosed within a respective pocket. The stitching 20 for forming the pockets also is seen in FIG. 2.

The more limited close-up view of FIG. 3 illustrates features associated with the multi-layered material that forms the pocketed heating system 16. The multi-layered material may include a mesh inner layer 34 and a heat reflective outer layer 36 that is supported by the mesh inner layer 34. The mesh layer 34 in FIG. 3 specifically is the grid-patterned material configured as a meshed screen. The mesh layer 34 may be a heat resistant screen, such as a fiberglass mesh. The heat reflective layer 36 may be configured as metal foil or comparable material that can both reflect heat and be flexible for suitable wrapping around the hose. The heat reflective layer 36 aids in maintaining the heat generated by the heater strips in an area adjacent to the hose.

FIG. 3 further provides an enhanced view of the stitching 20 that may be used to fix the pocketed heating system 16 to the insulation sleeve 14 in a manner that forms the pockets 18. Two portions of separate lines of stitching 20 are shown in FIG. 3. The stitching 20 may be a thread material that is both strong and heat resistant. A KEVLAR® thread is an example of a suitable material for use as the stitching 20.

Figure 4:
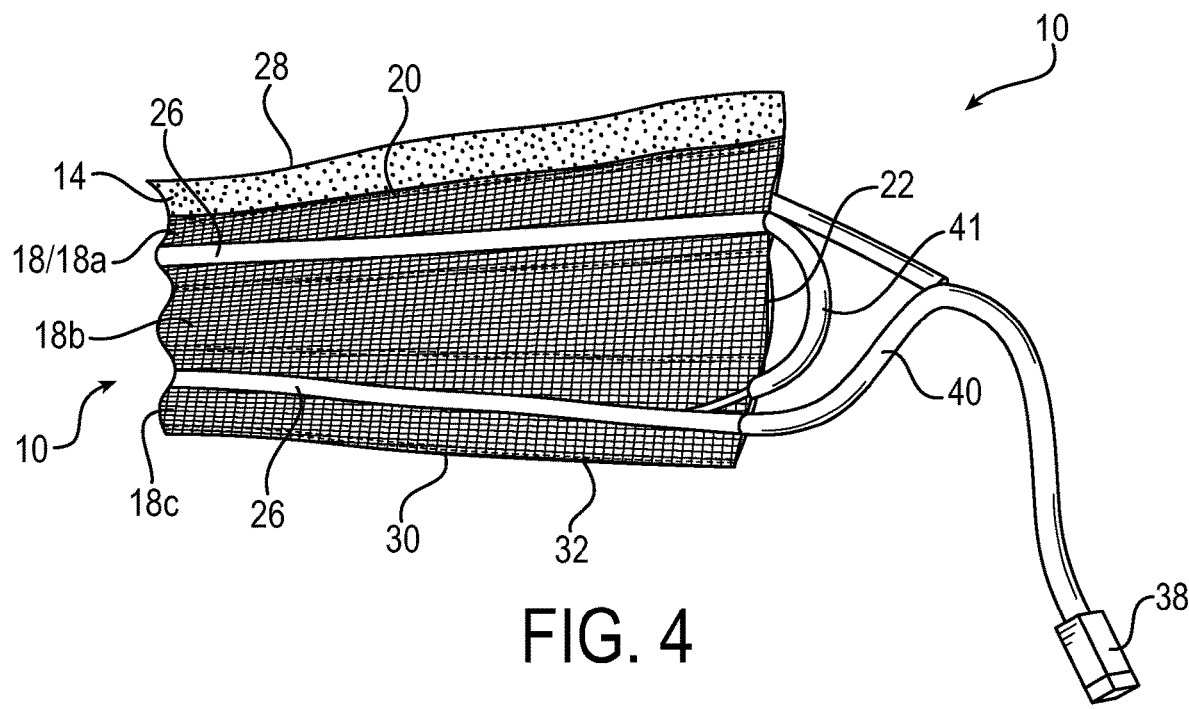
FIG. 4 is a drawing depicting a first or connecting end of the wrapped heating assembly of FIG. 1.

FIG. 4 is a drawing depicting the wrapped heating assembly 10 of FIG. 1 with focus on the first end 22. Accordingly, like components are denoted in FIG. 4 by like reference numerals as used in the previous figures. The hose is removed in the example depiction of FIG. 4. The first end 22 also may be referred to as a connecting end because the first/connecting end 22 may include an electrical connector 38 that provides an electrical connection to the one or more heater strips. The electrical connector 38 may be attached to lead wiring 40 to provide an electrical connection between the electrical connector 38 and the heater strips 26. Additional lead wiring 41 may provide an inner electrical connection directly between multiple heater strips 26. The electrical connector 38 also may provide a connection to external electrical wiring or external cables linking the heater strips 26 to a power source (not shown).

In addition, the electrical connector 38 may provide a connection to a complementary electrical connector associated with an adjacent wrapped heating assembly. Complementary end electrical connectors that extend from the sleeves of adjacent wrapped heating assemblies may be employed to daisy chain a plurality of wrapped heating assemblies of any of the embodiments together into a daisy chained heating system in which current flows between heater strips of adjacent wrapped heater assemblies via the electrical connectors 38. In this manner, long lengths of hose or tubing may be accommodated, and the daisy chained heating system may be used to heat multiple sections or separate hoses within an overall hose system. One of the wrapped heating assemblies may include a connector for connection to a power source, and in this manner only a single power source is needed to supply current to all of the plurality of wrapped heating assemblies via the other electrical connectors. The connector to the power source may be one of the connectors 38 or an additional connector. Furthermore, by mixing and matching different sized wrapped heating assemblies, whether by using multiple representative stock sizes and/or by cutting one or more assemblies to a desired size, the daisy chaining permits customization to accommodate any desired length of hosing.

The capability to daisy chain multiple wrapped heating assemblies thus provides a universal system that is modular for retrofitting different types, sizes, lengths, and shapes of hosing or tubing. The multiple wrapped heating assemblies may be individually wrapped and sized as desired, and then linked together in a daisy chained fashion by connecting the electrical connectors of adjacent wrapped heating assemblies. At least one of the wrapped heating assemblies would be linked to a power source, which may provide power to all of the wrapped heating assemblies though the daisy chained connectors. In this manner, installation is far easier as compared to conventional systems, and installation in particular may be performed in the field with only minimal training for use in a wide range of applications.

Figure 5:
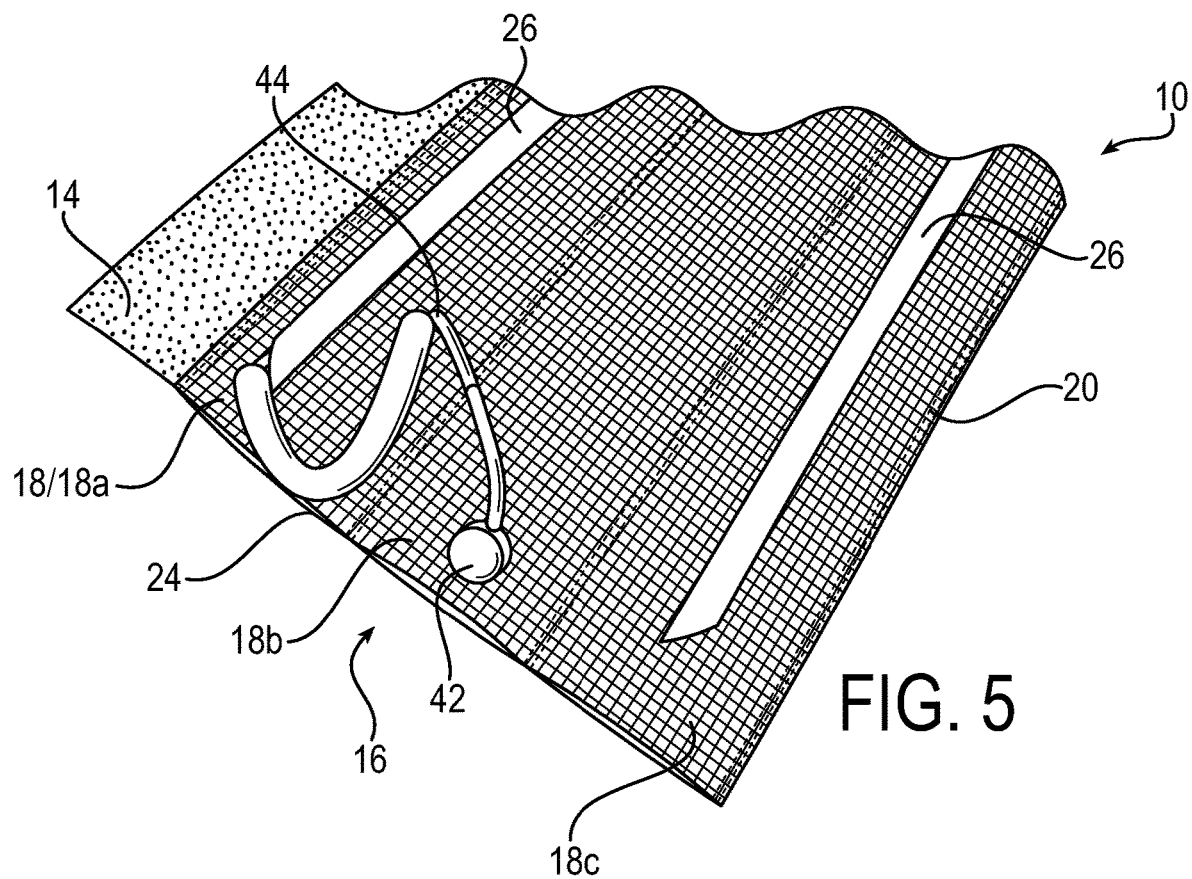
FIG. 5 is a drawing depicting a second end with a thermostat of the wrapped heating assembly of FIG. 1.

FIG. 5 is a drawing depicting the wrapped heating assembly 10 of FIG. 1 with focus on the second end 24. Accordingly, like components are denoted in FIG. 5 by like reference numerals as used in the previous figures. The hose also is removed in the example depiction of FIG. 5. The second end 24 also may be referred to as a thermal regulating end because the second/thermal regulating end may include a thermostat 42. The thermostat 42 may be electrically connected to one of the heater strips via lead wiring 44. Although the figures depict the electrical connector 38 and the thermostat 42 being at opposite ends of the wrapped heating assembly 10, this is an example configuration, and a given end of the wrapped heating assembly 10 may include both an electrical connector and a thermostat, one of them, or neither of them.

Using the thermostat 42, the wrapped heating assembly 10 may be a self-regulating assembly by which heat is generated in response to ambient conditions associated with the hose 12. The thermostat may include control circuitry that controls a flow of electrical current through the one or more heater strips 26, and the thermostat as is typical may include appropriate temperature sensor elements for sensing ambient temperatures associated with the hose 12. For example, the thermostat may sense the ambient environmental temperature around the hose, or may have sensor elements that are near or in contact with the hose for sensing the temperature of or adjacent to the hose itself.

For example, when a temperature sensor of the thermostat 42 senses that a hose temperature, or temperature more generally of a tubular member, (e.g., ambient temperature adjacent the hose/tubular member or a sensed temperature of the hose/tubular member itself) falls below a first predetermined threshold temperature, the control circuitry operates to close the circuit constituting the electrical connection with the heater strips 26 permit the flow of current through the heater strips. Heat of resistance is thereby generated in the vicinity of the hose or other tubular member to prevent or minimize condensation of gases, or coagulation or freezing of liquids, within the hose/tubular member at relatively low ambient temperatures below the first predetermined threshold temperature. When the temperature sensor of the thermostat 42 senses that the hose/tubular member temperature rises above a second predetermined threshold temperature, the control circuitry operates to open the circuit to the heater strips 26 to stop the flow of current. In exemplary embodiments, the second predetermined threshold temperature may be the same as the first predetermined threshold temperature. Alternatively, the second predetermined threshold temperature may be above the first predetermined threshold temperature to provide some overshoot or clearance in the restarting of the flow of current through the heater device. The first and second threshold temperatures may be varied and set to any suitable temperatures as warranted based on any particular application. The thermostat also may assist to control power consumption, and limit power consumption to specific conditions, such as for example potential freeze conditions and protecting the heating elements from overheating.

In a configuration in which multiple wrapped heating assemblies 10 are daisy chained together, a single thermostat 42 may have control circuitry that controls a flow of electrical current through the one or more heater strips of all of the plurality of wrapped heating assemblies in the daisy chained heating system, thereby controlling the heat output for the entire system. Typically, the thermostat 42 may be placed generally at the coldest location in the system to provide optimum heat control. In this manner, the default of the system essentially would be to heat when the coldest portion of the system falls below the first predetermined threshold temperature. In exemplary embodiments, the thermostat 42 may be a bimetallic disc thermostat that is attached in series with the lead wiring 44.

Figure 6:
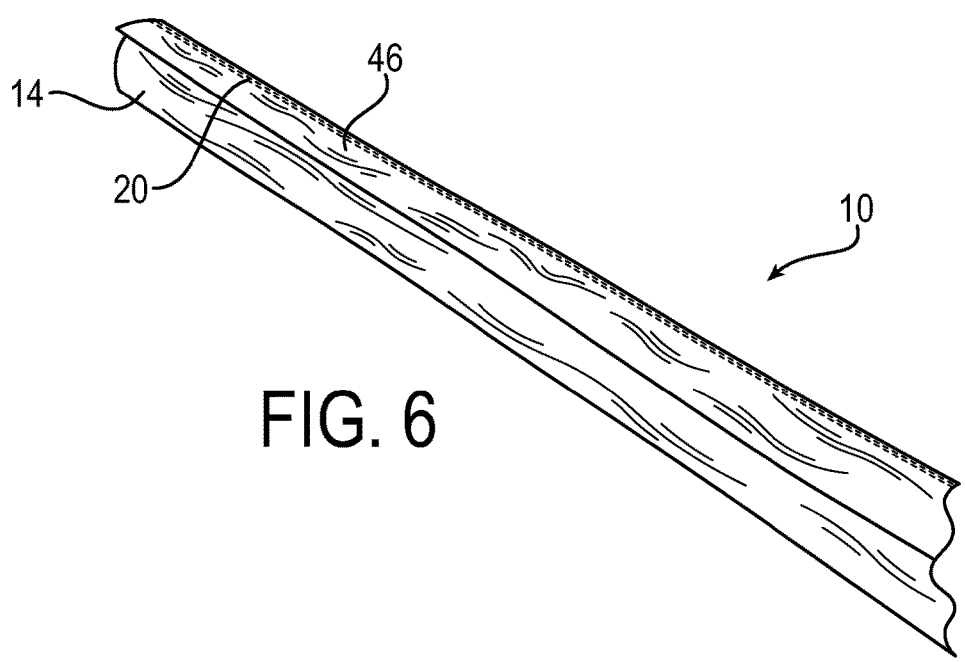
FIG. 6 is a drawing depicting an exemplary wrapped heating assembly in a wrapped position in accordance with embodiments of the present invention.

FIG. 6 is a drawing depicting the exemplary wrapped heating assembly 10 in a wrapped position in accordance with embodiments of the present invention. FIG. 6, therefore, shows the assembly from the viewpoint of an outer surface of the insulation sleeve 14. In this wrapped position, the insulation sleeve 14 encloses the hose and is secured in the wrapped position using the fastener strips described above. Portions of the stitching 20 also may be outwardly visible in the wrapped position.

In certain applications, abrasion resistance may be a significant issue. For such applications, the outer insulation sleeve 14 may include a protective coating material 46 applied to an outer surface of the carbon fiber material of the insulation sleeve 14. For example, a urethane protective coating material (seen by the "shine" in FIG. 6) may be applied to a woven nylon material forming the insulation sleeve 14, as nylon is particularly suitable for holding the urethane coating. In applications in which abrasion resistance is not particularly significant, a less expensive carbon fiber material, such as for example a woven polyester material, may be used as the insulation sleeve 14, and the additional protective coating material need not be provided.

FIG. 7 is a drawing depicting an end view of the wrapped heating assembly of FIG. 6 in a wrapped position in accordance with embodiments of the present invention. As seen in FIG. 7 as an exemplary view of the first end 22, depending upon the diameter or cross-sectional size of the hose or other tubular member 12, in the wrapped position the wrapped heating assembly 10 may extend around the hose 12 in multiple layers of wrapping. In addition, multiple wrapped heating assemblies 10 may be daisy chained as described above and concentrically wrapped around each other for another configuration of a multi-layered heating system. Again, the wrapped heating assembly 10 is versatile so as to accommodate various sizes, types, and shapes of hosing and other tubular members using one or multiple wrapped heating assemblies 10.

FIG. 8 is a drawing depicting another configuration of the exemplary wrapped heating assembly 10 in a wrapped position, in this example for a non-straight hose configuration. As representatively illustrated in FIG. 8, the wrapped heating assembly 10 may be flexible when in a wrapped position so as to accommodate various bends and turns (for example denoted by elements 46 and 47) in a hose system. FIG. 8 is not limiting, and various numbers, shapes, and locations of bends and turns in systems of hoses and other tubular members may be accommodated by the flexible nature of the wrapped heating assembly 10.

Figure 9:
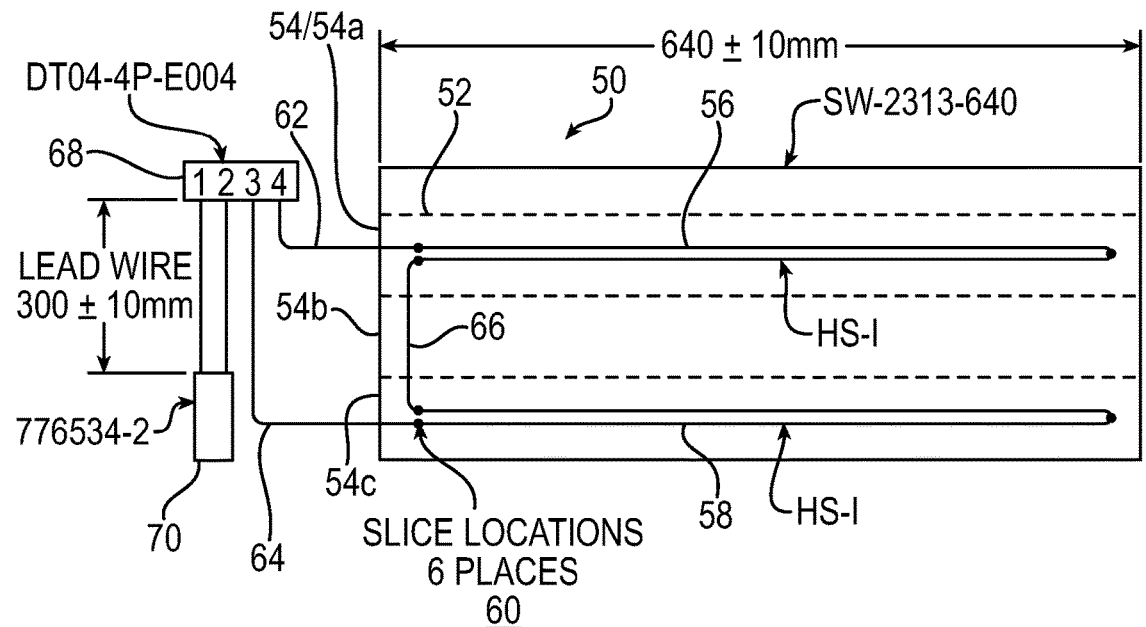
FIG. 9 is a schematic diagram depicting an exemplary wrapped heating assembly, in accordance with embodiments of the present invention.

FIG. 9 is a schematic diagram depicting an exemplary wrapped heating assembly 50, in accordance with embodiments of the present invention. FIG. 9 is a high level depiction that illustrates additional details as to the electrical pathways to provide heating. The dashed lines 52 represent stitched boundaries for forming pockets 54, including three pockets 54a, 54b, and 54c. In the example of FIG. 9, heater strips 56 and 58 respectively are contained in pockets 54a and 54c, i.e., pockets 54a and 54c are hot pockets, with pocket 54b being empty. Slice locations 60 are shown for openings in the pockets that permit axial insertion of the heater strips into the pockets, and to permit electrical connection via lead wires 62 and 64. A connection wire 66 connects heater strips 56 and 58 into a single circuit.

A bridge connector 68 may provide external connection to the heater strips (in this specific example via terminals 3 and 4). The bridge connector 68 also may be connected (e.g., via terminals 1 and 2) to an end connector 70. The end connector 70 in turn may be connected to a power source or to another complementary end connector of an adjacent wrapped heating assembly to provide a daisy chain connection as described above.

Figure 10:
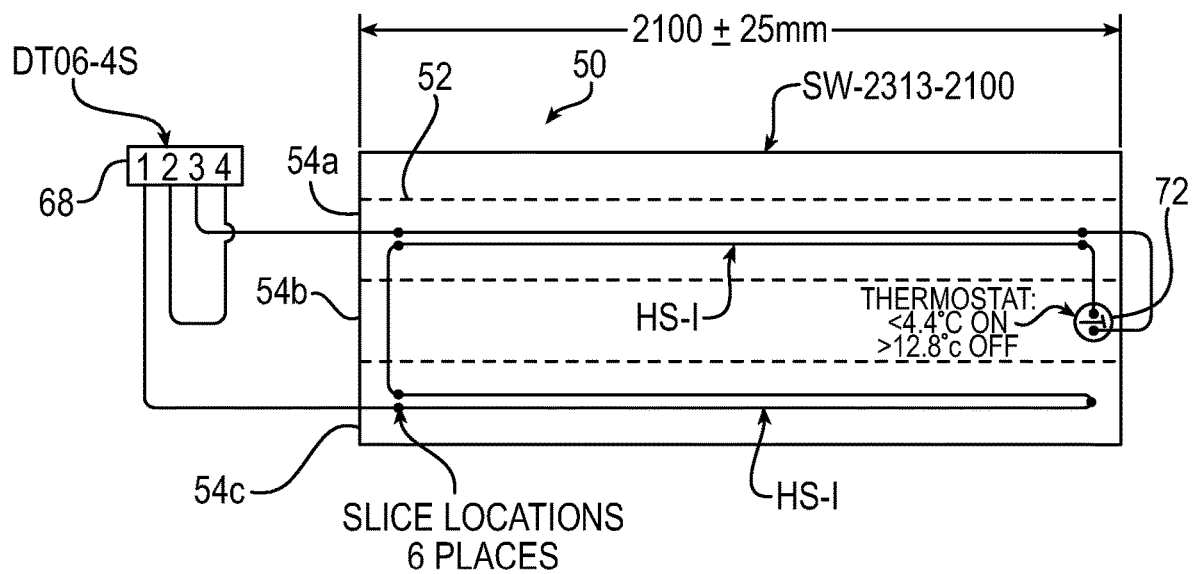
FIG. 10 is a schematic diagram depicting another configuration of an exemplary wrapped heating assembly, in accordance with embodiments of the present invention.

FIG. 10 is a schematic diagram depicting another configuration of the exemplary wrapped heating assembly 50. Accordingly, like components are identified with like reference numerals in FIG. 10 as in FIG. 9. FIG. 10 shows an alternative connection scheme that employs a thermostat 72. As shown in this particular example, the thermostat 72 may be embedded in one of the pockets that does not include a heater strip (e.g., pocket 54b). FIG. 10 also denotes exemplary values for the first and second predetermined threshold temperatures referenced above. In exemplary operation, when ambient temperature falls below the first predetermined threshold temperature of 4.4° C., the control circuitry of the thermostat 72 closes the circuit to the heater strips to turn the heaters on. When the temperature sensor of the thermostat 72 senses that the hose/tubular member temperature rises above the second predetermined threshold temperature 12.8° C., the control circuitry operates to open the circuit to the heater strips to stop the flow of current. The referenced temperature values are suitable non-limiting examples. It will again be appreciated that the first and second predetermined threshold temperatures may be varied and set to any suitable temperatures as warranted based on any particular application. Additional connectors also may be provided via the bridge connector 68 so as to connect the wrapped heating assembly 50 to a power source or to provide a daisy chained configuration of multiple wrapped heating assemblies.

FIGS. 11A, 11B, and 11C are related drawings depicting respectively inner, side cross-sectional, and outer views of an exemplary wrapped heating assembly 80 in accordance with embodiments of the present invention. The layered configuration shown in FIGS. 11A-C bears similarity to the previous embodiments. The wrapped heating assembly 80 may include an outer insulation sleeve 84 that has an inner surface onto which is fixed an inner pocketed heating system 86 similarly as in the previous embodiments. FIG. 11A is from an inner viewpoint substantially showing the pocketed heating system 86. An edge portion 88 of the sleeve 84 extends outward from the pocketed heating system 86, and the edge portion 88 may include on its inner surface a fastener element, such as a mechanical fastening strip, as described above. The dashed lines 90 in FIG. 11A represent stitched boundaries for forming pockets 94, including three pockets 94*a*, 94*b*, and 94*c*. FIG. 11C is from an outer viewpoint and thus depicts merely the outer surface of the insulation sleeve 84.

The side cross-sectional view of FIG. 11B shows exemplary layering of the wrapped heating assembly 80. In the example of FIG. 11B, heater strips 96 and 98 respectively are contained in pockets 94*a* and 94*c*, i.e., pockets 94*a* and 94*c* are hot pockets, with pocket 94*b* being empty. An inner layer of the wrapped heating assembly 80 may comprise a fiberglass mesh pocket layer 100. As described above with respect to FIG. 3, the mesh pocket layer 100 may be formed of multiple layers including a mesh or screen combined with a heat reflecting layer.

Referring back to FIG. 11B, the pockets may be formed with the fiberglass mesh 100 as an inner pocket layer, combined with an outer pocket layer 102 that may be made of a heat insulating material such as aluminum E-glass. In the example of FIG. 11B with the two heater strips 96 and 98, therefore, the heater strips as shown would be located between the inner pocket layer 100 and the outer pocket layer 102.

In exemplary embodiments, the sleeve 84 may have a multi-layer configuration in which the outer pocket layer 102 is an innermost layer of the sleeve 84. The sleeve 84 further may include a carbon fiber layer 104 (e.g., woven nylon or polyester) bonded to an outward facing side of the outer pocket layer 102. For example, an aluminum E-glass layer may be located on an inner surface of the carbon fiber material. In applications in which abrasion resistance is significant, the sleeve 84 further may include an abrasion cover or coating 106 (e.g., a urethane coating as described above) as the outermost sleeve layer.

By utilizing a heater strip system with a pocketed sleeve that may be daisy chained together with additional assemblies, the wrapped heating assembly of the present invention may be readily customized to various configurations of hoses or other tubular members, and further customized for a wide range of power densities and different electrical ratings. The wrapped heating assembly can be removed and replaced easily in the field by field service personnel with only minimal training. The daisy chained configuration permits use with long lengths of hose or tubing, and may be used to heat multiple sections or separate hoses within an overall hose system, with using only a single power source and thermostat for controlled heating of the multiple assemblies.

An aspect of the invention, therefore, is a wrapped heating assembly that may be wrapped around a tubular member for heating the tubular member. In exemplary embodiments, the wrapped heating assembly may include an outer insulation sleeve, a pocketed heating system that is fixed to an inner surface of the outer insulation sleeve in a manner that forms one or more longitudinal pockets that extend between a first end of the outer insulation sleeve and a second end of the outer insulation sleeve opposite from the first end, and one or more heater strips, with each one of the heater strips being respectively inserted longitudinally into a corresponding one of the pockets. Heat is generated by the heater strips when electrical current flows through the heater strips. The wrapped heating assembly may include one or more of the following features, either individually or in combination.

In an exemplary embodiment of the wrapped heating assembly, the pocketed heating system is fixed to an inner surface of the outer insulation sleeve in a manner that forms a plurality of pockets.

In an exemplary embodiment of the wrapped heating assembly, a number of heater strips differs from a number of pockets.

In an exemplary embodiment of the wrapped heating assembly, the outer insulation sleeve is made of a carbon fiber material.

In an exemplary embodiment of the wrapped heating assembly, the carbon fiber material is one of woven nylon or polyester.

In an exemplary embodiment of the wrapped heating assembly, the outer insulation sleeve includes a protective coating material applied to an outer surface of the carbon fiber material.

In an exemplary embodiment of the wrapped heating assembly, the protective coating material is a urethane coating.

In an exemplary embodiment of the wrapped heating assembly, the insulation sleeve further includes an aluminum E-glass layer on an inner surface of the carbon fiber material.

In an exemplary embodiment of the wrapped heating assembly, the pocketed heating system is stitched to an inner surface of the outer insulation sleeve by a thread material.

In an exemplary embodiment of the wrapped heating assembly, the thread material is a Kevlar thread.

In an exemplary embodiment of the wrapped heating assembly, the pocketed heating system comprises a multi-layered material including a mesh inner layer and a heat reflective outer layer.

In an exemplary embodiment of the wrapped heating assembly, the mesh inner layer is fiberglass.

In an exemplary embodiment of the wrapped heating assembly, the insulation sleeve has an edge portion including a fastener element, wherein the fastener element joins opposing edge portions of the insulation sleeve together to secure the wrapped heating assembly in a wrapped position.

In an exemplary embodiment of the wrapped heating assembly, the fastener element is a double mechanical strip fastener that extends longitudinally along at least one of the opposing edge portions of the insulation sleeve.

In an exemplary embodiment of the wrapped heating assembly, the wrapped heating assembly further includes an electrical connector to provide an electrical connection to the one or more heater strips.

In an exemplary embodiment of the wrapped heating assembly, the wrapped heating assembly further includes a thermostat including control circuitry that controls a flow of electrical current through the one or more heater strips.

In an exemplary embodiment of the wrapped heating assembly, the thermostat is a bimetallic disc thermostat.

In an exemplary embodiment of the wrapped heating assembly, the wrapped heating assembly is flexible when in a wrapped position.

In an exemplary embodiment of the wrapped heating assembly, the wrapped heating assembly comprises a plurality of heater strips respectively inserted into a plurality of pockets.

In an exemplary embodiment of the wrapped heating assembly, at least two of the heater strips have a different heat output capacity.

In an exemplary embodiment of the wrapped heating assembly, the one or more heater strips have an electrical rating of 120/240 VAC.

In an exemplary embodiment of the wrapped heating assembly, the one or more heater strips have an electrical rating of 12/24 VDC.

Another aspect of the invention is a daisy chained heating system of a plurality of wrapped heating assemblies. In exemplary embodiments, the daisy chained heating system includes a plurality of wrapped heating assemblies according to any of the embodiments, wherein adjacent wrapped heating assemblies each has a complementary electrical connector that are connected to each other to permit current flow between heater strips of adjacent wrapped heating assemblies. The daisy chained heating system may include one or more of the following features, either individually or in combination.

In an exemplary embodiment of daisy chained heating system, the system further includes a thermostat including control circuitry that controls a flow of electrical current through the one or more heater strips of all of the plurality of wrapped heating assemblies.

In an exemplary embodiment of daisy chained heating system, the system further includes a connector for connecting one of the plurality of wrapped heating assemblies to a power source, wherein the power source supplies current to each of the plurality of wrapped heating assemblies via the electrical connectors.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A wrapped heating assembly that may be wrapped around a tubular member for heating the tubular member, the wrapped heating assembly comprising:
    an outer insulation sleeve;
    a pocketed heating system that is fixed to an inner surface of the outer insulation sleeve in a manner that forms one or more longitudinal pockets that extend between a first end of the outer insulation sleeve and a second end of the outer insulation sleeve opposite from the first end; and
    one or more heater strips, with each one of the heater strips being respectively inserted longitudinally into a corresponding one of the pockets, wherein heat is generated by the heater strips when electrical current flows through the heater strips;
    wherein the pocketed heating system comprises a multi-layered material including a mesh inner layer and a heat reflective outer layer.

2. The wrapped heating assembly of claim 1, wherein the pocketed heating system is fixed to an inner surface of the outer insulation sleeve in a manner that forms a plurality of pockets.

3. The wrapped heating assembly of claim 2, wherein a number of heater strips differs from a number of pockets.

4. A wrapped heating assembly that may be wrapped around a tubular member for heating the tubular member, the wrapped heating assembly comprising:
    an outer insulation sleeve;
    a pocketed heating system that is fixed to an inner surface of the outer insulation sleeve in a manner that forms one or more longitudinal pockets that extend between a first end of the outer insulation sleeve and a second end of the outer insulation sleeve opposite from the first end; and
    one or more heater strips, with each one of the heater strips being respectively inserted longitudinally into a corresponding one of the pockets, wherein heat is generated by the heater strips when electrical current flows through the heater strips;
    wherein the outer insulation sleeve is made of a carbon fiber material.

5. The wrapped heating assembly of claim 4, wherein the outer insulation sleeve includes a protective coating material applied to an outer surface of the carbon fiber material.

6. The wrapped heating assembly of claim 5, wherein the protective coating material is a urethane coating.

7. The wrapped heating assembly of claim 4, wherein the insulation sleeve further includes an aluminum E-glass layer on an inner surface of the carbon fiber material.

8. The wrapped heating assembly of claim 1, wherein the pocketed heating system is stitched to an inner surface of the outer insulation sleeve by a thread material.

9. The wrapped heating assembly of claim 1, wherein the insulation sleeve has an edge portion including a fastener element, wherein the fastener element joins opposing edge portions of the insulation sleeve together to secure the wrapped heating assembly in a wrapped position.

10. The wrapped heating assembly of claim 9, wherein the fastener element is a double mechanical strip fastener that extends longitudinally along at least one of the opposing edge portions of the insulation sleeve.

11. The wrapped heating assembly of claim 1, further comprising an electrical connector to provide an electrical connection to the one or more heater strips.

12. The wrapped heating assembly of claim 1, further comprising a thermostat including control circuitry that controls a flow of electrical current through the one or more heater strips.

13. The wrapped heating assembly of claim 12, wherein the thermostat is a bimetallic disc thermostat.

14. The wrapped heating assembly of claim 1, wherein the wrapped heating assembly is flexible when in a wrapped position.

15. A wrapped heating assembly that may be wrapped around a tubular member for heating the tubular member, the wrapped heating assembly comprising:
    an outer insulation sleeve;
    a pocketed heating system that is fixed to an inner surface of the outer insulation sleeve in a manner that forms a plurality of longitudinal pockets that extend between a first end of the outer insulation sleeve and a second end of the outer insulation sleeve opposite from the first end; and
    a plurality of heater strips respectively inserted longitudinally into corresponding pockets of the plurality of longitudinal pockets, wherein heat is generated by the plurality of heater strips when electrical current flows through the plurality of heater strips;

wherein at least two of the plurality of heater strips have a different heat output capacity.

16. A daisy chained heating system of a plurality of wrapped heating assemblies comprising:
a plurality of wrapped heating assemblies according to claim 1, wherein adjacent wrapped heating assemblies each has a complementary electrical connector that are connected to each other to permit current flow between heater strips of adjacent wrapped heating assemblies.

17. The daisy chained heating system according to claim 16, further comprising a thermostat including control circuitry that controls a flow of electrical current through the one or more heater strips of all of the plurality of wrapped heating assemblies.

18. The daisy chained heating system according to claim 16, further comprising a connector for connecting one of the plurality of wrapped heating assemblies to a power source, wherein the power source supplies current to each of the plurality of wrapped heating assemblies via the electrical connectors.

* * * * *